J. B. ENTZ.
ENGINE STARTING AND AUTOMOBILE LIGHTING SYSTEM.
APPLICATION FILED MAR. 11, 1912. RENEWED JAN. 15, 1919.
1,338,857. Patented May 4, 1920.
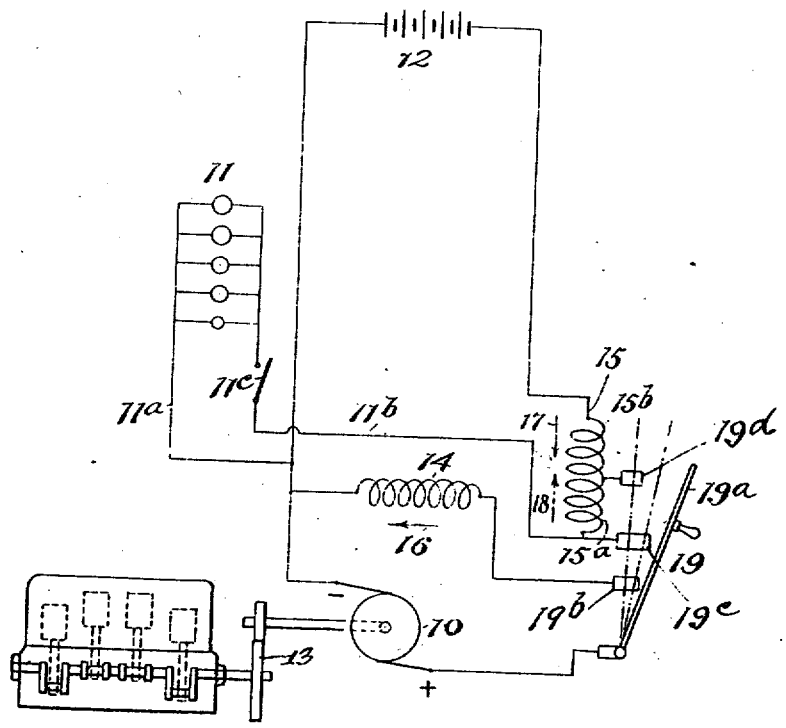
Witnesses
E. B. Gilchrist
H. B. Sullivan
Inventor
Justus B. Entz
by Thurston & Kwis
Attys

UNITED STATES PATENT OFFICE.

JUSTUS B. ENTZ, OF CLEVELAND, OHIO.

ENGINE-STARTING AND AUTOMOBILE-LIGHTING SYSTEM.

1,338,857.

Specification of Letters Patent.

Patented May 4, 1920.

Application filed March 11, 1912, Serial No. 682,859. Renewed January 15, 1919. Serial No. 271,335.

*To all whom it may concern:*

Be it known that I, JUSTUS B. ENTZ, a citizen of the United States, residing at Cleveland, in the county of Cuyahoga and State of Ohio, have invented a certain new and useful Improvement in Engine-Starting and Automobile-Lighting Systems, of which the following is a full, clear, and exact description.

This invention relates to a combined engine starting and lighting system, particularly for automobile use, and has for its main object to provide an efficient starting and lighting system, employing a dynamo electric machine which is permanently connected or coupled to the engine by a single power transmitting agency and which when functioning as a motor has desirable characteristics of an engine starting motor and when functioning as a generator has desirable characteristics of a lighting and battery charging generator.

In other words, it is one of the objects to provide in a system of this character a dynamo electric machine which when serving as a motor in starting the engine has high starting torque, and when driven by the engine serves at varying speed as a constant potential generator to supply to the lamps current at constant potential and to charge the battery at a substantially constant ampere rate.

In the attainment of the above and other objects, I employ a machine which when serving as a generator has its field excitation automatically governed to cause a substantially constant potential at the terminals of the machine, irrespective of the speed at which the machine is driven. This is accomplished preferably by utilizing a machine having a shunt winding which provides the main field excitation and a series winding which has a magnetizing action when the machine is serving as a motor, and a demagnetizing action when the machine is acting as a generator, the demagnetizing effect varying with the speed at which the machine is driven so as to cause the machine to have the generator characteristics above stated.

Further features of the invention reside in the provision of means whereby the charging rate of the battery may be varied to suit requirements; in a novel manner of connecting the lighting circuit to the generator and battery circuits; in the location and arrangement of the controlling switch with reference to various terminals including one of the terminals of the shunt winding and terminals of the series winding.

The above and other novel features are illustrated in the drawings and more specifically described in the specification and set forth in the appended claims.

In the single figure of the drawing, I have illustrated diagrammatically a system arranged in accordance with the preferred form of my invention.

In the drawing, 10 represents the armature of a dynamo-electric machine which serves as a motor to turn over or start the engine of the motor vehicle to which the system is applied, and after the engine is in operation, serves as a generator to supply current to the vehicle lamps 11 and to the storage battery 12, which it will be understood is employed to supply current to the lamps when the machine is stationary or to supply current to the motor for starting purposes.

The armature 10 is coupled or connected to the engine by a single power transmitting agency, which for convenience of illustration is here shown as consisting of a pair of gears 13 arranged between the armature shaft and the crank shaft of the engine. The armature may, however, be otherwise coupled to the engine.

The dynamo-electric machine is, as here shown, provided with a main shunt field winding 14, and an auxiliary series field winding 15, which produces a field cumulative with respect to the excitation caused by the shunt field winding when the machine is serving as a motor, and which has a demagnetizing action when the machine is serving as a generator. Assuming that the polarity of the terminals of the generator are as indicated in the drawing, the direction of current through the shunt winding is at all times in the direction indicated by the arrow 16. When the machine is functioning as a motor, the direction of current through the series winding 15 is in the direction indicated by the arrow 17, but when the machine is functioning as a generator, the direction of current through the series winding is in the direction indicated by the dotted arrow 18, and hence is reversed through the series winding.

In the preferred form of my invention, I employ a sectional series field winding, consisting in this case of two sections 15ª and 15ᵇ, and I prefer to employ a switch 19, the primary purpose of which is to connect and disconnect the battery 12 and the dynamo electric machine, but which here serves also to disconnect or to connect into circuit the shunt field winding 14. I therefore provide for this purpose a so-called three-point switch comprising a movable switch blade 19ª and three switch contacts as follows; a contact 19ᵇ, which is connected to one terminal of the shunt winding 14, the other terminal of which is permanently connected to the generator, a contact 19ᶜ which is connected to one end terminal of the series winding 15, and a contact 19ᵈ which is connected to a tap extending outwardly from substantially the middle point between the two terminals of the series winding. It will be seen that when this switch is opened, the battery and dynamo electric machine are disconnected and the shunt winding 14 is disconnected from both the battery and dynamo electric machine. There can therefore be no waste of energy of the battery through the shunt winding when the machine is idle, and there will be no current generated in the armature 10 of the dynamo electric machine when the machine is in motion and the generator is disconnected from the battery and lighting circuits. This feature of disconnecting the shunt field from the armature when the battery is disconnected eliminates all danger of the field magnetism and voltage building up to a dangerous point as would be the case if the machine were driven as a shunt machine on open circuit. It will be seen also that when the switch blade is in its first closed position, the shunt field winding is connected in the circuit and the battery is connected to the dynamo electric machine with the entire series field winding in the battery and generator circuits, and when the switch is in its full closed position, the section 15ª of the series winding 15 is short circuited, leaving the section 15ᵇ only effective.

A further novel feature of my invention resides in the connection of the conductors 11ª, 11ᵇ of the lighting circuit to the generator or battery circuits. It will be noted that one conductor 11ª of the lighting circuit is permanently connected to one side of the battery and to one side of the generator, and that the other conductor 11ᵇ of the lighting circuit, which while disconnected from the generator when the switch 19 is open, is connected to the side of the generator opposite to that to which the conductor 11 is connected when the switch is closed, and this connection is made at a point between the armature 10 and the series field winding. The lamps are therefore not disconnected from the battery when the switch 19 is opened. The lamps are controlled independently of the switch 19 by a separate switch here indicated at 11ᶜ.

The series and shunt field coils 14 and 15 are so wound that when the motor is started to turn over or to start the engine by closing the switch 19, current from the battery 12 passes through the two windings in a direction such that the magnetic fields produced thereby are cumulative or additive, thereby producing a strong magnetic field and providing a good torque. Preferably, the machine is so designed that the field is saturated by current passing through the shunt field winding, and the maximum current through one section of the series field winding, so that when the machine is serving as a motor in starting the engine, it has substantially the same maximum torque whether the entire series winding or whether only one section 15ᵇ is connected in circuit.

After the engine is in operation and the dynamo electric machine is serving as a generator to charge the battery or to light the lamps 11 or both, the current is reversed through the series winding and therefore the series winding has a demagnetizing action which varies of course with the value of the current passing through the winding and therefore with the speed at which the generator is driven. This variable demagnetizing action of the series winding with variations in speed is such that a substantially constant potential is maintained at the terminals of the generator, regardless of the speed of the generator, for the reason that a slight increase in current in the series coil due to an increase in speed decreases the field magnetization, and a decrease in current due to a decrease in speed causes an increase in field magnetization. This automatic regulation is obtained with a very slight increase or decrease of current, and hence the battery is charged at a substantially constant ampere rate, insuring practically a constant voltage across the terminals of the machine. By connecting the lighting circuit to the dynamo electric machine at a point between the series field winding and the armature, merely the current which passes through the battery traverses the series winding.

By providing a sectional series field winding so that the whole or part of the winding may be employed, I am enabled to charge the battery at different ampere rates. By connecting in circuit the entire series winding, not only is there a greater ohmic resistance between the battery and the generator armature, but there is a greater demagnetizing action than is the case if merely the section 15$^b$ is in circuit. Consequently, when the entire winding is in circuit, the current output of the generator is less than when merely the section 15$^b$ of the series winding is utilized. Furthermore, by utilizing the switch 19, not only for connecting and disconnecting the battery and dynamo electric machine, but also for varying the effective turns of the series winding, I am enabled to obtain a gradual starting of the motor by moving the switch 19 from open position to full closed position slowly so that the series winding may be utilized as a rheostat in shifting the switch from the half closed position to full closed position.

By my invention above described, including the numerous details of arrangement and electrical connections, I obtain an engine starting and lighting system which is very efficient and is extremely simple in its arrangement and number of parts employed, especially as I utilize only one dynamo electric machine, and one power transmission agency between the dynamo electric machine and the engine, and require no gear or clutch shifting means which are often the source of inconvenience and trouble, and if not properly actuated, frequently result in injury to the engine or the starting and lighting system.

Having thus described my invention, what I claim is:

1. In combination an internal combustion engine, an engine starting and lighting system, comprising a dynamo electric machine designed to serve as a motor to start the engine or as a generator, a battery and a lamp circuit both adapted to receive current from the dynamo electric machine, the latter having a shunt field winding for producing a field of constant polarity and a sectional series field winding which produces a field which assists the field of the shunt field winding when the machine is serving as a motor and which opposes the field of said shunt field winding to an extent dependent upon the speed of the engine, when the machine is serving as a generator, and means for connecting into circuit one or more of the series winding sections.

2. In combination, an internal combustion engine, an engine starting and lighting system comprising a dynamo electric machine adapted to serve as a motor to start the engine and as a generator after the engine is started, a battery and a lighting circuit both adapted to receive current from the dynamo electric machine, the latter having an armature, a shunt field winding which produces a field of constant polarity and a sectional series field winding which produces a field which assists the field of the shunt field winding when the machine is serving as a motor and which opposes said field to an extent dependent upon the speed of the engine when the machine is serving as a generator, and means for connecting or disconnecting the battery and dynamo electric machine, for connecting or disconnecting the shunt field winding with respect to the battery and armature, and for varying the effective sections of the series winding.

3. In a starting and lighting system adapted to be employed in connection with internal combustion engines, a dynamo electric machine having an armature and a field member provided with series and shunt windings for producing fields which assist each other when the machine is serving as a motor to start the engine and oppose each other when the machine is driven by the engine as a generator, a battery, a lamp circuit, and a switch for connecting and disconnecting the armature and battery and for opening and closing the shunt field circuit, said switch when closed serving to connect the lamp circuit across the terminals of the armature and when opened leaving the lamp circuit connected to the battery, whereby the generator current supplied to the lamp circuit does not pass through the series field winding and when the switch is opened the lamp circuit is not interrupted.

4. In a starting and lighting system adapted to be employed in connection with internal combustion engines, a dynamo electric machine having an armature and a field member provided with series and shunt windings for producing fields which assist each other when the machine is serving as a motor to start the engine and oppose each other when the machine is driven by the engine as a generator, a battery, a lamp circuit, and a switch for connecting and disconnecting the armature and battery and for rendering the shunt field winding effective and ineffective, said switch when closed serving to connect the lamp circuit across the terminals of the armature and when opened leaving the lamp circuit connected to the battery, whereby the current passing through the lamp circuit does not pass through the series field winding when the machine is serving as a generator and is charging the battery and when the switch is opened the lamp circuit is not interrupted.

5. In combination with an internal combustion engine, a dynamo electric machine adapted to serve as a motor to start the engine and as a generator after the engine is started, a battery adapted to supply current to the dynamo electric machine or to be charged thereby, a lighting circuit adapted to receive current from the dynamo electric machine or from the battery, the dynamo electric machine comprising an armature, a shunt field winding and a series field winding, the latter assisting the former when the machine is serving as a motor, and opposing the same when the machine is serving as a generator, the lighting circuit having a connection with the dynamo electric machine at a point between the series field winding and the armature thereof.

In testimony whereof, I hereunto affix my signature in the presence of two witnesses.

JUSTUS B. ENTZ.

Witnesses:
A. F. KWIS,
A. J. HUDSON.